United States Patent Office 3,591,555
Patented July 6, 1971

3,591,555
POLY-AMIDES-IMIDES AND THEIR PROCESS OF MANUFACTURE
Guy Rabilloud, Bernard Sillion, and Gabriel de Gaudemaris, Grenoble, France, assignors to Institut Francais du Petrole, des Carburants et Lubrifiants, Rueil Malmaison, Hauts-de-Seine, France
No Drawing. Filed Dec. 3, 1968, Ser. No. 780,900
Claims priority, application France, Dec. 6, 1967, 131,257
Int. Cl. C08g 20/32
U.S. Cl. 260—47  11 Claims

ABSTRACT OF THE DISCLOSURE

Poly-amide-imide consisting essentially of a chain of the same of different repeating units of the general formula:

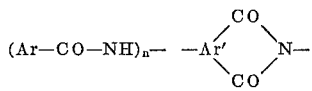

in which $n$ is an integer from 1 to 10, Ar is a divalent radical of 2–22 carbon atoms and Ar' a trivalent aromatic radical of 3–22 carbon atoms.

---

This invention relates to new poly-amides-imides and their process of manufacture, said poly-amides-imides consisting of a chain of repeating units:

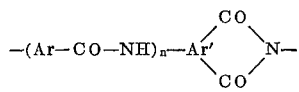

in which $n$ is a positive integer usually lower than 10 and preferably equal to 1. Ar is a divalent homocyclic or heterocyclic aromatic radical the two free valences of which are linked to separate carbon atoms in any position with respect to each other. These rings preferably comprise from 5 to 7 atoms selected from the group comprising carbon, oxygen, sulfur and nitrogen, several cycles, for example 2 to 4, being optionally fused or linked. Preferably each Ar radical contains 2 to 22 carbon atoms, 0 to 3 oxygen atoms, 0 to 3 sulfur atoms, 0 to 3 nitrogen atoms and hydrogen atoms in the amount satisfying the valences.

Ar' is a trivalent, homocyclic or heterocyclic aromatic radical, the 3 free valences of which are linked to separate carbon atoms, 2 of the being in ortho position with respect to one another. Ar' comprises one or several fused rings, for Example 2 to 4, containing 5 to 7 atoms selected from the group comprising carbon, oxygen, sulfur and nitrogen. Preferably Ar' contains 3 to 22 carbon atoms, 0 to 3 oxygen atoms, 0 to 3 sulfur atoms, 0 to 3 nitrogen atoms and hydrogen atoms in an amount satisfying the valences.

When Ar comprises several interconnected rings, the linking elements are preferably the direct bond or one of the following groups: —O—; —S—; —SO$_2$—; —CH$_2$—

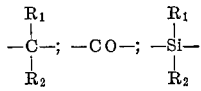

—CONH—; —SO— in which R$_1$ and R$_2$ are alkyl groups of 1–4 carbon atoms.

As examples of rings from which the Ar radicals may be derived, there will be mentioned:

(a) benzene, naphthalene, phenanthrene, perylene, fluorene, anthracene, diphenyl, diphenylmethane, benzophenone, diphenylsulfide, diphenylsulfone, diphenylsulfoxide, benzanilide, diphenyl ether, dimethyldiphenylsilane, pyridine, pyridazine, pyrazine, pyrimidine, thiophene, furan, quinoline, isoquinoline, indole, isoindole, phenoxazine, benzothiazine, dibenzothiazine, acridine, phenazine, quinazoline, quinoxaline, 1,3-thiazole, 1,3-oxazole, imidazole, carbazole, benzimidazole and 1,2,4-triazine.

(b) 1,3,4-oxadiazole, 1,3,4-thiadiazole, 1,3,5-triazine and furazane.

As examples of rings which may be the base of the Ar' radicals there may be given those mentioned in paragraph (a) above.

In the prior processes, the poly-amides-imides were manufactured either by reacting a dihalogenide of an aromatic diacid and an aromatic dianhydride with an aromatic diamine, or by reacting such a compound as trimellitoyl chloride with an aromatic diamine. These methods which are of appreciable utility in some cases however suffer from the inconvenience of liberating a halohydric acid during the polycondensation reaction. Furthermore these methods do not lead to the products of this invention.

It is now possible with the process of this invention to manufacture new poly-amides-imides without the above inconvenience, said process using as starting material difunctional monomers containing aromatic nuclei interlinked by means of —CO—NH— groups and having a reactive ortho diester or ortho-acid-ester group at one end of the molecule and an amine function at the other end. These monomers are stable with respect to oxidation, they can be stored easily and they permit stopping the polycondensation at any moment of the reaction while maintaining a perfect stoichiometry since the reacting groups are present on the same molecule. It is thus possible to manufacture prepolymers which is also an object of this invention. The prepolymers are soluble in many organic solvents and melt within a convenient temperature range. This makes their use easier, particularly for manufacturing molded articles or as adhesives of wood, metals, glass and the like, or as binders in the manufacture of laminates.

According to this invention, there are used difunctional monomers the Formulae 1 and 2 of which are given hereafter:

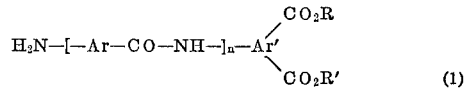 (1)

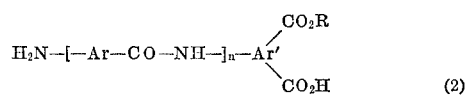 (2)

in which R and R' are monovalent hydrocarbon radicals containing for example 1 to 12 carbon atoms optionally having a free hydroxyl group, for example issued from glycols at least one function of which has been used in the esterification, for example alkyl, cycloalkyl, hydroxyalkyl or aryl radicals, $n$, Ar and Ar' being defined as above.

The synthesis of the monomers of Formulae 1 and 2 may be carried out in several manners. By way of examples, 2 methods are described hereafter:

METHOD No. 1

First step.—Esterification and hydrogenation.
During the first step, there is carried out a total or partial esterification of one of the following compounds (3 to 5) and a hydrogenation of the obtained esters so as to isolate amino-esters such as (6 to 8)

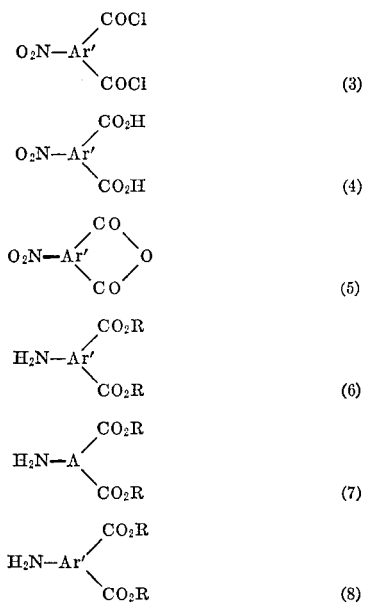

Second step.—Condensation of the obtained compounds with a compound of formula $O_2N$—Ar—COX (9) and hydrogenation.

In the second step, a halogenide of a nitro-aromatic acid (9 where X is a halogen atom) is condensed with one of the amino-esters (6 to 8) and the resulting condensation product is hydrogenated so as to convert the nitro group to an amino group.

This step leads to compounds such as (10 to 12):

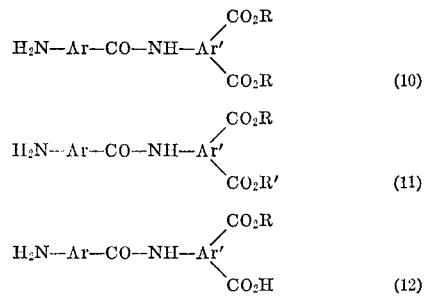

After the hydrogenation reaction, the second step may be repeated with a compound (9) in which the Ar radical is identical to, or different from the previous one and this may be repeated at will.

METHOD No. 2

This method uses the same basic compounds but differs on the operating way. In a first step the diacid (4) is hydrogenated so as to obtain a diacid (13) and the latter is reacted with the halogenide (9) to obtain the diacid (14).

The latter, after esterification and hydrogenation, leads to the amino-ester (10 to 12)

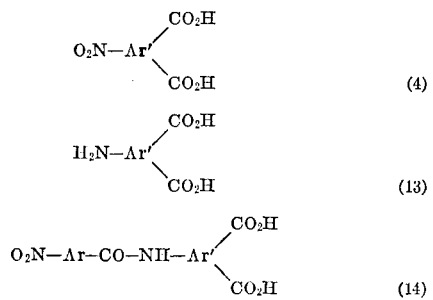

The esterification of the compounds 3, 4, 5 and 14 is carried out according to the conventional methods, starting from alcohols, glycols or phenols. The hydrogenation of the nitro group is carried out according to the known chemical or catalytic processes.

The condensation of the acid halides (9) on the compounds (6, 7, 8 and 13) is obtained either by the so-called interfacial method or by the so-called solvent method, for example as follows:

In the interfacial method, water is admixed with the amino compound used either as the free amine or as a halohydrate and an emulsifier is optionally added. A proton acceptor is added thereafter and the mixture is stirred.

During this stirring, there is added a solution of the acid halogenide (9) in an inert organic solvent. The mixture is stirred and, when the reaction has come to its end, the resulting product is separated, washed and dried. The solvent for the acid halogenide may be a non-aromatic cyclic oxygen-containing solvent, for example tetrahydrofuran or cyclohexanone, or a chlorinated solvent, for example methylene chloride, or otherwise a solvent such as benzene, nitrobenzene or benzonitrile.

The proton acceptor is a compound which tends to eliminate the halohydric acid during the reaction. The following may be used: sodium hydroxide, soidum carbonate, calcium carbonate, tertiary bases such as triethylamine, trimethylamine and other similar compounds, and finally any proton acceptor known as effective in interfacial reactions.

In the "solution" method, the amino compound is dissolved in a polar solvent and the resulting solution is cooled down to a temperature between 5 and $-20°$ C. To this stirred solution, there is added the acid chloride (9) in the same solvent. The mixture is stirred at low temperature for a few minutes and then at ambient temperature for one or several hours. Amongst the suitable solvents, the following may be mentioned: dimethylformamide, dimethylacetamide, N-methylpyrrolidone, pyridine, hexamethylphosphoramide. The halohydric acid liberated during the reaction is retained by the solvent or by an agent such as triethylamine or sodium carbonate which is added to the solvent either at the start or at the end of the reaction.

Among the monomers of the (1) and (2) types, those which have a low melting point and a high solubility will be preferably used.

The polycondensation of the monomers (1) and (2) is carried out at high temperature, for example 100 to 300° C. either in a high-boiling solvent or in the fused state generally beyond 200° C. When the reaction is carried out in a solvent, the resulting polymers usually exhibit a low molecular weight and the condensation must be completed by a thermal treatment at a higher temperature.

According to the "melted" method, the monomer is brought to a temperature which is higher than its melting point and sufficiently higher to permit an easy reaction between the esters and amines groups. This temperature is usually between 200 and 300° C. The polycondensation of (1) is usually accompanied with a release of alcohol, glycol or phenol according to the chosen monomer. The polycondensation of (2) is accompanied with a release of water together with alcohol, glycol or phenol. There is progressively formed a solid of pale colour. The resulting product is usually crushed and heated under vacuum or inert atmosphere to a temperature progressively increasing from 250 to 400° C. During this step, cyclic amides are formed and the final polymer may be described as (15) in the following scheme:

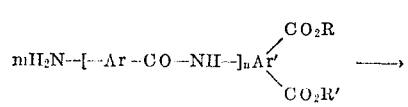

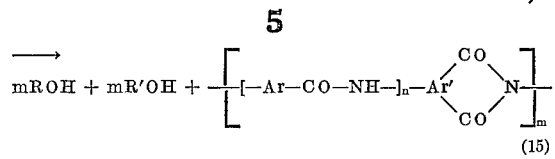

(15)

and

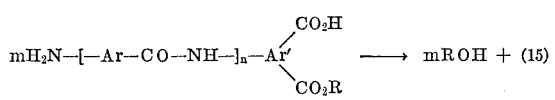

In these formulae, $m$ is an integer which cannot be easily determined.

In these polycondensation reactions, it is possible to admix various monomers in any proportion, since the stoichiometrical amount is always present due to the nature of the monomers. The resulting copolymers exhibit various properties according to the used monomers.

The polycondensation reaction may be easily controlled. In particular it is easy to stop it when the polycondensation degree is low, $m$ being for example between 2 and 10, so as to obtain a prepolymer which can melt and dissolve in conventional organic solvents or polar solvents or mixtures thereof. This polymerization is usually stopped when the inherent viscosity of the prepolymer attains a value in the range of from 0.05 to 0.45 for a concentration of 0.5% by weight in N-methyl pyrrolidone at 30° C. At this stage, the prepolymers may be used for manufacturing laminates or as basis for adhesives.

The invention will be further described in the following non-limitative examples, Examples 1 to 3 being however not within the scope of the invention. By "phthalic acid" there is meant "orthophtalic acid."

EXAMPLE 1

Manufacture of the diethyl ester of 4-(m, aminobenzamido phthalic acid (a) Diethyl ester of 4-nitro phthalic acid.—105 g. (0.5 mole) of commercial 4-nitro phthalic acid and 1 liter ethanol containing from 5 to 10% by weight of hydrochloric acid are introduced in a vessel of a 2 liters capacity. The mixture is heated to reflux for 10 hours and the excess of ethanol distilled. The residual oil is washed with diluted sodium hydroxide, extracted with ether and distilled. 73.5 g. (54%) of the diethyl ester of 4-nitro phthalic acid are thus recovered. Boiling point: 140° C. under 0.01 mm. Hg.

The recovered 4-nitro phthalic acid may be re-esterified and this may be repeated so as to obtain a total yield of about 95%.

(b) Diethyl ester of 4-amino phthalic acid.—The diethyl ester of 4-amino phthalic acid is dissolved in ethanol and treated with hydrogen in the presence of platinum oxide under 4 kg./cm.$^2$ of hydrogen pressure and at ambient temperature. The yield is 95–97%.

(c) Diethyl ester of 4-(m. nitrobenzamido) phthalic acid.—23.7 g. (0.1 mole) of the diethyl ester of 4-amino phthalic acid are dissolved in 100 ml. of anhydrous pyridine and 0.1 mole of m. nitrobenzoyl chloride are added stepwise thereto. After heating at reflux for 30 min., the solution is cooled down and poured into water. The yield of raw product is 90%. After recrystallization from ethanol, the yield of pure product is 78%.

(d) Diethyl ester of 4-(m. aminobenzamido)phthalic acid.—The hydrogenation of the diethyl ester of 4-(m. nitrobenzamido) phthalic acid is carried out under the same conditions as those of paragraph (b). The yield is 96% (melting point: 143° C.).

EXAMPLE 2

Manufacture of 3-(m. aminobenzamido)-3',4'-diethoxycarbonyl benzanilide 7.12 g. (20 m. moles) of the diethyl ester of 4-(m. aminobenzamido) phthalic acid (Example 1) are dissolved in 25 ml. of pyridine and reacted with 4.2 g. (20 m. moles) of m. nitrobenzoyl chloride. The yield of 3-(m. nitrobenzamido) - 3',4' - diethoxycarbonyl benzanilide is 89%. After hydrogenation, 3-(m. aminobenzamido)-3',4'-diethoxycarbonyl benzanilide is 89%. After hydrogenation, 3-(m. nitrobenzamido)-3',4'-diethoxycarbonyl benzanilide is obtained with a yield of 95%.

EXAMPLE 3

Manufacture of the monoethyl ester of 4-(m. aminobenzamido) phthalic acid (a) 4-amino phthalic acid.—42 g. (0.2 mole) of 4-nitro phthalic acid are dissolved in 150 ml. of water containing 0.41 mole of sodium hydroxide. Acetic acid is added so as to bring the pH value to 8 and hydrogen is introduced as well as 0.2 g. of platinum oxide. The temperature of the solution is maintained at 45° C. and the hydrogen pressure at 3 kg./cm.$^2$.

At the end of the reaction, the catalyst is removed by filtration and, after addition of 100 ml. of concentrated HCl, the hydrochloride of 4-amino phthalic acid is recovered.

(b) 4-(m. nitrobenzamido) phthalic acid.—4.35 g. (20 m. moles) of the above-mentioned hydrochloride are dissolved in 50 ml. of iced water containing 80 m. moles of sodium hydroxide. This solution is stirred and 20 m. moles of m. nitrobenzoyl chloride dissolved in 30 ml. of benzene are added thereto. After stirring for 10 min. the aqueous phase is separated, washed several times with ether and acidified with concentrated hydrochloric acid. The yield of 4-(m. nitrobenzamido) phthalic acid is 82%.

(c) Monoethyl ester of 4 - (m. aminobenzamido) phthalic acid.—The 4-(m. nitrobenzamido) phthalic acid is converted to the anhydride by heating at 90–100° C. with a large excess of acetic anhydride.

The substituted phthalic anhydride is esterified in boiling ethanol and 2 isomers are obtained: the 1-monoethylester of 4-(m. nitrobenzamido) phthalic acid and the 2-monoethylester of the same. This mixture is hydrogenated in alcohol in the presence of platinum oxide to give a mixture of the amino isomers.

EXAMPLE 4

2 g. of the diethyl ester of 4-(m. aminobenzamido) phthalic acid are heated under argon atmosphere for 1 hour at 250° C., 1 hour at 275° C., and 2 hours and a half at 300° C. The resulting pale solid is crushed and heated under 0.01 mm. Hg for 1 hour at 250° C., 1 hour at 300° C., 1 hour at 350° C. and 30 min. at 400° C.

The elemental analysis, as well as the I.R. and U.V. spectra, show that the polymer essentially comprises [phenylene carbonyl-3 imino (1H, 3H-dioxo-1,3-iso-indolediyl-5,2)] units.

The thermogravimetric analysis of this polymer, carried out with a temperature rise of 60° C. per hour, shows decomposition thresholds at 340° C. in the air and 365° C. under argon atmosphere.

EXAMPLE 5

Example 4 is repeated, starting from the diethyl ester of 4-(p. aminobenzamido) phthalic acid so as to obtain a polymer containing [phenylenecarbonyl-4 imino (1H, 3H-dioxo - 1,3 - iso-indolediyl - 5,2)] units which is insoluble and infusible.

Decomposition levels: 350° C. in the air and 370° C. under argon atmosphere.

EXAMPLE 6

Starting from the 3 - (m. aminobenzamido)-3',4'-diethoxycarbonyl benzanilide, there is obtained an insoluble and infusible polymer which contains [phenylenecarbonyl- 3 iminophenylenecarbonyl-3 imino (1H, 3H-dioxo-1,3-isoindolediyl-5,2)] units.

Decomposition thresholds: 340° C. in the air and 360° C. under argon atmosphere.

EXAMPLE 7

Copolycondensation of the diethylester of 4-(m. aminobenzamido) phthalic acid and the diethyl ester of 4-(4'-p. aminophenoxy-benzamido) phthalic acid.

The two monomers are admixed in equimolecular proportions and thereafter heated as described in Example 4. The resulting polymer comprises the two following units: [phenylenecarbonyl-3 imino (1H, 3H-dioxo-1,3-isoindolediyl-5,2] and [phenyleneoxy-4 phenylenecarbonyl-4 imino (1H, 3H-dioxo-1,3-isoindolediyl-5,2)]. The thermal stability is the same as that of the polymer of Example 4.

EXAMPLE 8

1 g. of the diethylester of 4-(m. aminobenzamido) phthalic acid is dissolved in 5 ml. of deaerated N-methyl pyrrolidone and the solution is heated at reflux for 15 hours. After cooling, the prepolymer is separated by precipitation in water. It exhibits an inherent viscosity of 0.06 at 30° C. for a concentration of 0.5% in N-methyl pyrrolidone. Its melting point is 160° C.

EXAMPLE 9

1 g. of the diethyl ester of 4-(m. aminobenzamido) phthalic acid is heated for 30 min. at 200° C., 10 min. at 225° C., 20 min. at 250° C., 30 min. at 275° C. and one hour at 300° C. The resulting prepolymer has a melting point of 290° C. and an inherent viscosity of 0.12 as determined at 30° C. for a concentration of 0.5% in N-methyl pyrrolidone.

EXAMPLE 10

2 g. of the diphenyl ester of 4-(m. aminobenzamido) phthalic acid are heated under inert atmosphere at 275° C. for 3 hr. 30 min. The resulting prepolymer has a melting point of 280° C. and an inherent viscosity of 0.11 when determined as in Example 9.

EXAMPLE 11

A prepolymer is manufactured by heating 4 g. of the diethyl ester of 4-(m. aminobenzamido) phthalic acid at 300° C. for 1 hour and a half under inert atmosphere. This prepolymer as a softening point of 185° C. and an inherent viscosity of 0.09 (at 30° C. and 0.5% concentration in N-methyl pyrrolidone). This prepolymer is dissolved in 6 g. of N-methyl pyrrolidone and the resulting solution is used to impregnate a glass cloth of the type E, armour 181, without finish. The solvent is evaporated under reduced pressure and the impregnated cloth is cut in 8 identical pieces which are superposed and placed between the plates of a press heated at 200° C. The temperature of the plates is progressively raised to 300° C. at a rate of 2° C. per minute, and the polycondensation is continued at that temperature while a low contact pressure is applied. After one hour, the pressure is raised to 15 kg./cm.² and the material left one more hour at 300° C. and 1 hour at 350° C. After cooling, probes are cut to determine the mechanical properties.

As specific examples of other polymers which may be manufactured according to the general and specific methods hereabove described, the following may be mentioned, which conform to Formula 15 wherein the Ar and Ar' radicals are derivatives of the following hydrocarbons and heterocyclic compounds (the positions of substitution of Ar by the vicinal —CO— and —N< groups respectively as well as the positions of substitution of Ar' by the vicinal —CO—, —CO— and —NH— groups respectively are given, in this order, between brackets):

| Example No. | Ar | Ar' |
|---|---|---|
| 12 | Toluene (3,5) | Pyridine (2,3,6). |
| 13 | Meta-xylene (2,4) | Do. |
| 14 | 4-bromo benzene (1,3) | Benzene (1,2,4). |
| 15 | 2-chloro benzene (1,3) | Do. |
| 16 | Toluene (2,3) | Do. |
| 17 | Toluene (3,5) | Do. |
| 18 | 4-methoxy benzene (1,3) | Do. |
| 19 | 4-phenoxy benzene (1,3) | Do. |
| 20 | Naphthalene (1,3) | |
| 21 | Naphthalene (2,5) | Do. |
| 22 | Pyridine (3,5) | Do. |
| 23 | Pyridine (2,5) | Do. |
| 24 | Quinoxaline (2,6) | Do. |
| 25 | Pyrazine (2,5) | Do. |
| 26 | Furan (2,5) | Do. |
| 27 | Quinoline (2,5) | Do. |
| 28 | Quinoline (4,8) | Do. |
| 29 | Diphenylether (4,4') | Do. |
| 30 | Diphenylether (4,3') | Do. |
| 31 | Diphenylether (3,4') | Do. |
| 32 | Diphenylether (3,3') | Do. |
| 33 | Diphenyl (4,4') | Do. |
| 34 | Diphenyl (3,3') | Do. |
| 35 | Diphenylmethane (4,4') | Do. |
| 36 | Diphenylmethane (3,3') | Do. |
| 37 | Diphenylsulfide (4,4') | Do. |
| 38 | Benzophenone (4,4') | Do. |
| 39 | Benzophenone (4,3') | Do. |
| 40 | Benzophenone (3,3') | Do. |
| 41 | Benzanilide (3',4) | Do. |
| 42 | Benzanilide (4',3) | Do. |
| 43 | Benzanilide (4',4) | Do. |
| 44 | Benzanilide (4,3') | Do. |
| 45 | Benzanilide (4,4') | Do. |
| 46 | Dimethyldiphenylsilane (4,4') | Do. |
| 47 | 2,2-diphenyl propane (4,4') | Do. |
| 48 | Benzene (1,3) | Benzene (1,2,3). |
| 49 | Benzene (1,4) | Do. |
| 50 | Diphenylether (4,4') | Do. |
| 51 | Diphenylmethane (4,4') | Do. |
| 52 | Diphenylsulfide (4,4') | Do. |
| 53 | Benzophenone (4,4') | Do. |
| 54 | Benzophenone (4,3') | Do. |
| 55 | Benzanilide (3',3) | Do. |
| 56 | Benzanilide (4',4) | Do. |
| 57 | Benzanilide (3,3') | Do. |
| 58 | Benzanilide (4,4') | Do. |
| 59 | Benzene (1,3) | Naphthalene (1,8,3). |
| 60 | Benzene (1,4) | Do. |
| 61 | Diphenylether (4,4') | Do. |
| 62 | Benzanilide (3',3) | Do. |
| 63 | Benzanilide (3,3') | Do. |
| 64 | Benzanilide (4,4') | Do. |
| 65 | Benzene (1,3) | Naphthalene (1,8,4). |
| 66 | Benzene (1,4) | Do. |
| 67 | Naphthalene (1,3) | Do. |
| 68 | Benzene (1,3) | Naphthalene (2,3,5). |
| 69 | Benzanilide (3',3) | Do. |
| 70 | Benzene (1,3 | Pyridine (2,3,5). |
| 71 | Diphenylether (4,4') | Do. |
| 72 | Pyridine (3,5) | Do. |
| 73 | Benzene (1,3) | Pyridine (2,3,6). |
| 74 | Pyridine (3,5) | Do. |
| 75 | Benzene (1,3) | Quinoline (2,3,8). |
| 76 | Pyridine (3,5) | Do. |
| 77 | Quinoline (2,5) | Do. |
| 78 | Benzene (1,3) | Quinoline (5,6,8). |
| 79 | do | Pyrazine (2,3,5). |
| 80 | Pyrazine (2,5) | Do. |
| 81 | Pyridine (3,5) | Do. |
| 82 | Benzene (1,3) | Quinoxaline (2,3,6). |
| 83 | Quinoxaline (2,6) | Do. |

What is claimed as this invention is:

1. A poly-amide-imide consisting essentially of a chain of the same or different repeating units of the general formula:

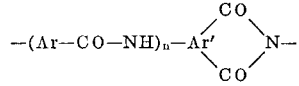

in which $n$ is an integer from 1 to 10, Ar is a divalent aromatic radical consisting of 2–22 carbons, 0 to 3 oxygens, 0 to 3 sulfurs, 0 to 3 nitrogens, and hydrogen and Ar' a trivalent aromatic radical consisting of 3–22 carbons, 0 to 3 oxygens, 0 to 3 sulfurs, 0 to 3 nitrogens and hydrogen.

2. A poly-amide-imide according to claim 1, wherein Ar consists of 1 to 4 aromatic rings each containing 5 to 7 substituted or unsubstituted atoms in the ring, said atoms being selected from the group consisting of carbon, oxygen, sulfur and nitrogen, the substituents on said substituted ring atoms being selected from the group consisting of methyl, chlorine, bromine, methoxy and phenoxy and Ar' consists of 1 to 4 aromatic rings each containing 5 to 7 atoms in the ring, said atoms being selected from the group consisting of carbon, oxygen, sulfur and nitrogen.

3. A poly-amide-imide according to claim 1, wherein at least one of Ar and Ar' consists of several aromatic rings inter-connected by means of one linking element selected from the group consisting of, —O—, —S—, —SO—, —CH$_2$—,

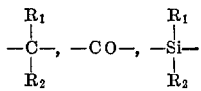

and —CONH—, R$_1$ and R$_2$ being alkyl of 1–4 carbon atoms.

4. A poly-amide-imide according to claim 2, wherein at least one of Ar and Ar' consists of several aromatic rings inter connected by means of one linking element selected from the group consisting of —O—, —S—, —SO—, —CH$_2$—,

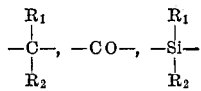

and —CONH—, R$_1$ and R$_2$ being alkyl of 1–4 carbon atoms.

5. A poly-amide-imide according to claim 1, wherein the repeating units are phenylene carbonyl-3-imino (1H, 3H-dioxo-1,3-iso-indolediyl-5,2).

6. Poly-amide-imide according to claim 1, wherein the repeating units are phenylene carbonyl-4-imino (IH, 3H-dioxo-1,3-isoindolediyl-5,2).

7. Poly-amide-imide according to claim 1, wherein the repeating units are phenylene carbonyl-3 iminophenylene carbonyl-3-imino (1H, 3H-dioxo-1,3-isoindolediyl-5,2).

8. Poly-amide-imide according to claim 1, wherein the repeating units are phenylene carbonyl-3 imino (1H, 3H - dioxo - 1,3 - isoindoleriyl-5,2) and phenyleneoxy-4 phenylene carbonyl-4 imino (1H, 3H - dioxo - 1,3 - isoindolediyl-5,2).

9. A poly-amide-imide according to claim 1, having an inherent visosity of from about 0.05 to about 0.45 as measured at a concentration of 0.5% by weight in N-methyl pyrrolidone at 30° C.

10. A poly-amide-imide according to claim 9, having an inherent viscosity of 0.09.

11. A poly-amide-imide according to claim 1, containing from 2 to 10 repeating units.

References Cited
UNITED STATES PATENTS 3,414,546  12/1968  Werntz _____ 260—78

WILLIAM SHORT, Primary Examiner

L. L. LEE, Assistant Examiner

U.S. Cl. X.R.

117—124, 131, 148; 161—191; 260—30.2, 30.6, 32.6, 65, 78, 326